United States Patent
Larsson et al.

(10) Patent No.: US 9,589,171 B1
(45) Date of Patent: Mar. 7, 2017

(54) METHOD AND DEVICE FOR DETECTING IF A FINGER IS PRESENT AND SENSING A FINGERPRINT PATTERN

(71) Applicant: Fingerprint Cards AB, Göteborg (SE)

(72) Inventors: Andreas Larsson, Herrljunga (SE);
Hans Thörnblom, Kungsbacka (SE);
Fredrik Ramberg, Göteborg (SE);
Frank Robert Riedijk, Delft (NL);
Robert Hägglund, Linköping (SE)

(73) Assignee: FINGERPRINT CARDS AB, Göteborg (SE)

( * ) Notice: Subject to any disclaimer, the term of this patent is extended or adjusted under 35 U.S.C. 154(b) by 0 days.

(21) Appl. No.: 15/176,891

(22) Filed: Jun. 8, 2016

(30) Foreign Application Priority Data

Oct. 2, 2015 (SE) ...................................... 1551262

(51) Int. Cl.
*G06K 9/00* (2006.01)

(52) U.S. Cl.
CPC ......... *G06K 9/0012* (2013.01); *G06K 9/0002* (2013.01)

(58) Field of Classification Search
CPC .......................... G06K 9/0012; G06K 9/0002
See application file for complete search history.

(56) References Cited

U.S. PATENT DOCUMENTS

| | | | |
|---|---|---|---|
| 8,031,046 B2 | 10/2011 | Franza et al. | |
| 2003/0210809 A1* | 11/2003 | Kim | G06K 9/0002 382/124 |
| 2009/0243824 A1* | 10/2009 | Peterson | B60R 1/12 340/435 |
| 2013/0314148 A1* | 11/2013 | Kang | G06K 9/0002 327/517 |
| 2015/0070311 A1* | 3/2015 | Caldwell | G06F 3/0416 345/174 |
| 2015/0370364 A1* | 12/2015 | Jordan | G06F 3/044 345/174 |
| 2016/0246396 A1* | 8/2016 | Dickinson | G06F 3/03545 |

FOREIGN PATENT DOCUMENTS

WO 2015101266 A1 7/2015

* cited by examiner

*Primary Examiner* — Kim Vu
*Assistant Examiner* — Molly Delaney
(74) *Attorney, Agent, or Firm* — Remarck Law Group PLC

(57) ABSTRACT

The present invention relates to a method of sensing a fingerprint pattern of a finger using a fingerprint sensing device comprising an array of sensing elements; an electrically conductive finger detecting structure; and finger detecting circuitry connected to the finger detecting structure for providing a finger detection signal indicative of a capacitive coupling between the finger detecting structure and the finger. The method comprises the steps of: comparing the finger detection signal with a first threshold value indicating a first capacitive coupling, and a second threshold value indicating a second capacitive coupling stronger than the first capacitive coupling; and activating at least a subset of the sensing elements when the finger detection signal changes from a first value indicating a capacitive coupling weaker than the first capacitive coupling to a second value indicating a capacitive coupling stronger than the second capacitive coupling.

15 Claims, 5 Drawing Sheets

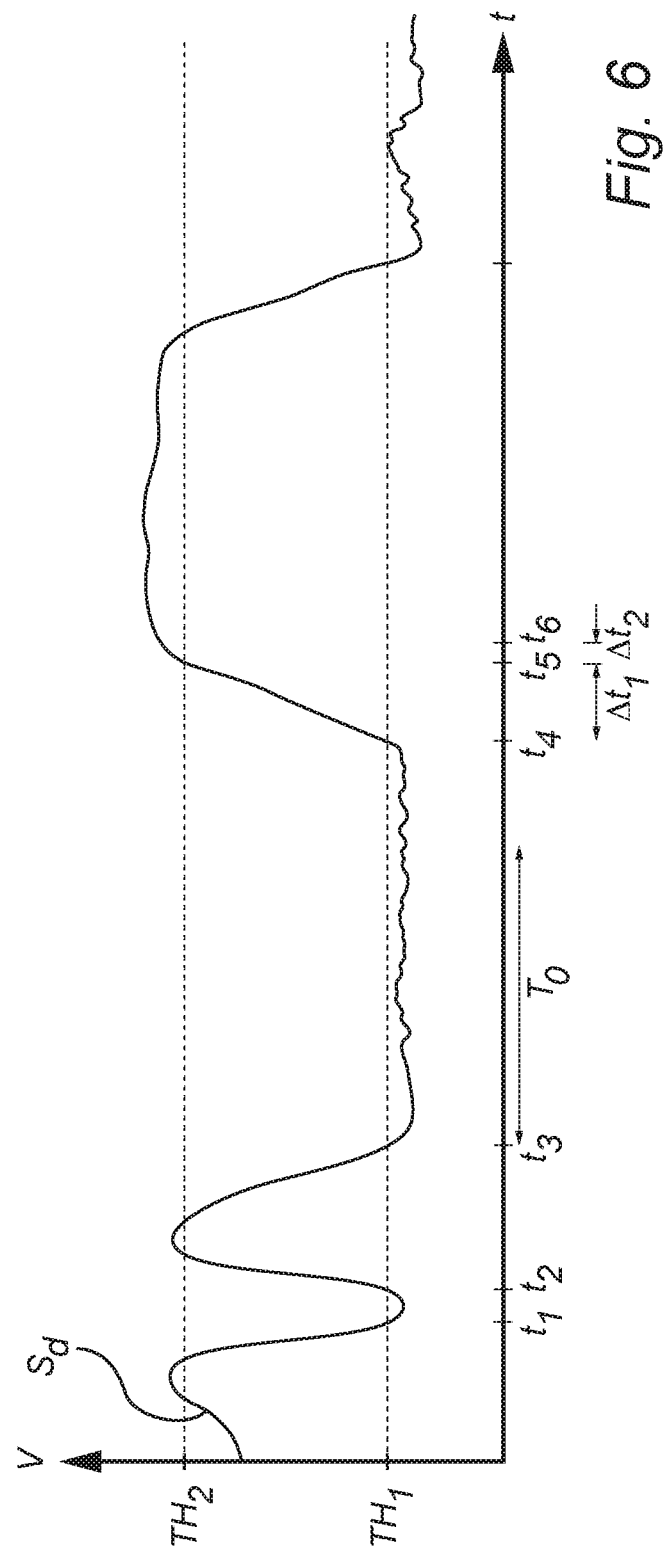

METHOD AND DEVICE FOR DETECTING IF A FINGER IS PRESENT AND SENSING A FINGERPRINT PATTERN

CROSS REFERENCE TO RELATED APPLICATIONS

This application claims the benefit of Swedish Patent Application No. 1551262-7 filed Oct. 2, 2015. The disclosure of the above application is incorporated herein by reference in its entirety.

FIELD OF THE INVENTION

The present invention relates to a fingerprint sensing device and to a method of sensing a fingerprint pattern.

BACKGROUND OF THE INVENTION

Various types of biometric systems are used more and more in order to provide for increased security and/or enhanced user convenience.

In particular, fingerprint sensing systems have been adopted in, for example, consumer electronic devices, thanks to their small form factor, high performance and user acceptance.

To provide for a low energy consumption of the fingerprint sensing system, the fingerprint sensing system should only operate when there is a finger on the fingerprint sensing device comprised in the fingerprint sensing system. On the other hand, the fingerprint sensing system may be required to independently determine whether or not a finger is present on the sensing device and to sense the fingerprint pattern of the finger when the finger is placed on the sensing device.

U.S. Pat. No. 8,031,046 discloses a finger sensing device in which finger sensing electrodes may be bussed together and connected to a bussed electrode amplifier which is typically maintained on. A sample and hold and decoder circuit is connected to the bussed electrode amplifiers and may output an average power from the bussed group of electrodes that is compared with a threshold level. If the average power is higher than the threshold level, it is determined that the finger is present, and a fingerprint image is acquired.

Although the solution proposed by U.S. Pat. No. 8,031,046 seems to provide for a rather energy-efficient finger detect functionality, there still appears to be room for improvement.

SUMMARY

In view of the above-mentioned and other drawbacks of the prior art, it is an object of the present invention to achieve an improved fingerprint sensing device and method of sensing a fingerprint pattern, in particular providing for more energy efficient operation of the fingerprint sensing device.

According to a first aspect of the present invention, it is therefore provided a method of sensing a fingerprint pattern of a finger using a fingerprint sensing device comprising: an array of sensing elements for sensing the fingerprint pattern; an electrically conductive finger detecting structure; finger detecting circuitry connected to the finger detecting structure for providing a finger detection signal indicative of a capacitive coupling between the finger detecting structure and the finger; and operation control circuitry connected to the sensing elements for activating the sensing elements to sense the fingerprint pattern, and connected to the finger detecting circuitry for evaluating the finger detection signal. The method comprises the steps of: comparing the finger detection signal with a first threshold value indicating a first capacitive coupling between the finger detecting structure and the finger, and a second threshold value indicating a second capacitive coupling between the finger detecting structure and the finger, stronger than the first capacitive coupling; and activating, when the finger detection signal changes from a first value indicating a capacitive coupling weaker than the first capacitive coupling to a second value indicating a capacitive coupling stronger than the second capacitive coupling, at least a subset of the sensing elements to sense at least a portion of the fingerprint pattern.

The sensing elements may, for example, be capacitive sensing elements, each providing a measure indicative of the capacitive coupling between that particular sensing element and a finger surface touching the sensor surface. Sensing elements at locations corresponding to ridges in the fingerprint will exhibit a stronger capacitive coupling to the finger than sensing elements at locations corresponding to valleys in the fingerprint.

However, the various embodiments of the present invention are not limited to a fingerprint sensing device comprising sensing elements utilizing a particular fingerprint sensing technology, but are equally applicable to, for instance, optical, thermal or piezo-electric fingerprint sensors etc.

By the term "activating" a sensing element (a subset of the sensing elements) should be understood to control the sensing element to transition from an inactive state in which the sensing element does not provide a fingerprint pattern sensing signal to an active state in which the sensing element provides such a sensing signal.

The fingerprint sensing device may comprise additional circuitry for operating on the sensing signals provided by the sensing elements. Such additional circuitry, which may for instance include sampling circuitry and analog-to-digital conversion circuitry, may also be activated by the operation control circuitry in response to the behavior of the finger detection signal in relation to the above-mentioned first and second threshold values.

For example, the finger detection signal and the first and second threshold values may be analog or digital values indicative of a voltage, which may in turn be proportional to the capacitance of the capacitor constituted by the finger (or other conductive object in the vicinity of the finger detecting structure), the finger detecting structure and the dielectric material therebetween.

The sensed fingerprint pattern may be used for various purposes, such as biometric enrollment or authentication, or fingerprint pattern based navigation etc.

The present invention is based upon the realization that a more accurate finger detection can be achieved by providing at least one finger detecting structure and dedicated finger detecting circuitry connected to the at least one finger detecting structure, and adapting the condition for activating the fingerprint sensing device to the behavior of a user placing her/his finger on the surface of the fingerprint sensing device. In particular, the present inventors have realized that the approach of the finger towards the sensor surface is significantly different from other situations that may occur, such as when the electronic device comprising the fingerprint sensing device is in a pocket or purse together with conductive items.

Further, it has been realized that the above-mentioned approach of the finger can be at least approximately discriminated from other situations using a first threshold value indicating a relatively weak capacitive coupling (relatively large distance to the sensor surface—"in the vicinity of the sensor surface"), and a second threshold value indicating a relatively strong capacitive coupling (relatively short distance to the sensor surface—"contact with the sensor surface").

By requiring that there is a change from a sufficiently weak capacitive coupling ("in the vicinity") to a sufficiently strong capacitive coupling ("contact") before the fingerprint sensing device is activated, various cases of unwanted activation may be avoided. For instance, constant contact between the sensor surface and the skin or another conductive object, or intermittent contact without sufficient removal between contact events can be prevented from activating the fingerprint sensing device. For instance, the first threshold value may be selected to indicate a capacitive coupling that is sufficiently low to make it probable that the capacitive coupling indicated by the finger detection circuitry will be stronger when the fingerprint sensing device is located in the user's pocket. This means that the sensing elements will not be activated as long as the fingerprint sensing device is in the pocket.

To further improve the reliability of the finger detection, the step of activating may be carried out only when the finger detection signal changes from the first value to the second value within a time duration shorter than a first predefined time duration.

The present inventors have realized that a user who has decided to deliberately place her/his finger on the fingerprint sensor will practically always do so in such a way that the time between detecting that the finger is in the vicinity of the sensor surface and detecting that the finger is in contact with the sensor surface is shorter than a certain time, such as shorter than about one tenth of a second.

To avoid erroneously indicating that a finger has been detected in response to a detected noise signal, the difference in time scale between a typical finger approach and a typical noise signal can advantageously be used. To that end, it may additionally be required that the above-mentioned time duration within which the finger detection signal changes from the first value to the second value is longer than a given time duration, such as longer than one hundredth of a second.

To improve the reliability of the finger detection even further, it may additionally be required for activation of the fingerprint sensing device that the finger detection signal indicates a capacitive coupling weaker than the first capacitive coupling for a time duration longer than a second time duration, which may be predefined or dynamically determined, before changing from the first value to the second value.

Hereby, a situation where a conductive object approaches the sensor surface with a shorter time between approaches than is feasible and/or probable for a real finger placement event can be discriminated from a real finger placement event, and unnecessary (partial) activation of the fingerprint sensing device can be prevented.

The above-mentioned second predefined time duration may advantageously be longer than one second.

To provide for an even further improved qualification of a finger placement event before activating sensing elements to acquire at least a partial fingerprint image, it may be required that the finger detection signal indicates a predefined minimum finger contact time duration before the sensing elements are activated. To that end, the step of activating may be carried out only when the finger detection signal indicates a capacitive coupling stronger than the second capacitive coupling for a time duration longer than a third predefined time duration.

Studies indicate that the third predefined time duration may advantageously be longer than 10 milliseconds to promote acquisition of a good fingerprint image.

According to various embodiments, furthermore, the fingerprint sensing device may comprise at least a first and a second electrically conductive finger detecting structure, each being connected to the finger detecting circuitry, and the method may further comprise the steps of: evaluating a first finger detection signal indicative of a capacitive coupling between the first finger detecting and the finger; and evaluating a second finger detection signal indicative of a capacitive coupling between the second finger detecting and the finger. In these embodiments, the step of activating may be carried only out when each of the first finger detection signal and the second finger detection signal changes from the first value to the second value.

In these embodiments, information from different areas of the fingerprint sensing device may be evaluated to further qualify the finger placement event before activating sensing elements.

The above-mentioned first threshold value may be a predefined value. According to various embodiments, however, the first threshold may be determined based on an evaluation of the finger detection signal. In particular, the method according to embodiments of the present invention may comprise the steps of: evaluating the finger detection signal to determine a noise level of the finger detection signal; and determining the first threshold level based on the noise level. Such a calibration of the operation control circuitry of the fingerprint sensing device may take place in connection with production of the fingerprint sensing device and/or in connection with production of the electronic device comprising the fingerprint sensing device, and/or during use of the fingerprint sensing device.

In order to improve the quality of the fingerprint acquisition taking place when it has been determined that it is likely that a finger placement event has occurred, the finger detection signal may be used to determine at least one setting of the sensing elements. For instance, a value of the finger detection signal corresponding to a local maximum of the capacitive coupling may be used for determining settings, such as shift and/or gain of the measurement chain comprising the sensing elements and any further functional components, such as sample-and-hold circuitry and analog-to-digital conversion circuitry. For instance, the sampling timing may be determined based no the finger detection signal.

According to various embodiments, the step of activating may advantageously comprise the steps of activating, when the finger detection signal changes from the first value to the second value, a subset of the sensing elements; evaluating a partial image resulting from the subset; and activating, when the evaluation of the partial image indicates that a finger can be sensed by the fingerprint sensing device, all sensing elements in the array of sensing elements to sense the fingerprint pattern.

In these embodiments, the entire sensor may be activated only when analysis of a partial image confirms that there is actually a finger on the sensor.

According to a second aspect of the present invention, there is provided a fingerprint sensing device for sensing a fingerprint pattern of a finger, the fingerprint sensing device comprising: an array of sensing elements for sensing the fingerprint pattern; an electrically conductive finger detecting structure; finger detecting circuitry connected to the finger detecting structure for providing a finger detection signal indicative of a capacitive coupling between the finger detecting structure and the finger; and operation control circuitry connected to the sensing elements and to the finger detecting circuitry for: comparing the finger detection signal with a first threshold value indicating a first capacitive coupling between the finger detecting structure and the finger, and a second threshold value indicating a second capacitive coupling between the finger detecting structure and the finger, stronger than the first capacitive coupling; and activating, when the finger detection signal changes from a first value indicating a capacitive coupling weaker than the first capacitive coupling to a second value indicating a capacitive coupling stronger than the second capacitive coupling, at least a subset of the sensing elements to sense the fingerprint pattern.

The operation control circuitry may be realized as hardware and/or as software running on one or several processors.

As was mentioned further above, the sensing elements in the array of sensing elements may advantageously be capacitive sensing elements, each comprising a conductive sensing structure (such as a metal plate) and a charge amplifier connected to the sensing structure for providing an output signal indicative of a change of a charge carried by the sensing structure in response to a change in potential difference between the finger (or other conductive object) and the sensing structure.

The finger detecting structure may advantageously be provided in the form of a metal plate that is substantially larger (greater area) than a sensing structure comprised in a sensing element. For instance, the finger detecting structure may be at least 20 times larger than a sensing structure, or more preferably at least 100 times larger. Hereby, the capacitive coupling between the finger detecting structure and the possible finger will be correspondingly stronger than the capacitive coupling between a sensing structure and the possible finger.

According to embodiments, the fingerprint sensing device may comprise at least a first finger detecting structure and a second finger detecting structure. These finger detecting structures may co-operate, or be used for redundancy. If, for instance, it is determined that a conductive structure such as a sensor bezel, has been arranged too close to one of the finger detecting structures, that finger detecting structure can be deactivated so that it is not used for finger detection.

To provide for accurate finger detection and to increase the probability that there is always at least one finger detecting structure that is not disturbed by an adjacent conductive structure, the finger detecting structures may be arranged on opposite sides of the array of sensing elements. For example, the array of sensing elements may be rectangular, and separate finger detecting structures may be arranged on two or more sides of the array of sensing elements.

According to various embodiments, furthermore, the finger detecting circuitry may comprise a charge amplifier including a first input connected to the finger detecting structure; a second input; an output for providing the finger detection signal; a feedback capacitor connected between the first input and the output; and at least one amplifier stage between the first and second inputs, and the output, wherein the charge amplifier is configured in such a way that a potential at the first input substantially follows a potential at the second input.

That the potential at the first input (often referred to as the 'negative' input) follows the potential at the second input (often referred to as the 'positive' input) should be understood to mean that a change in the potential at the second input results in a substantially corresponding change in the potential at the first input. Depending on the actual configuration of the charge amplifier, the potential at the first input may be substantially the same as the potential at the second input, or there may be a substantially constant potential difference between the first and second inputs. If, for instance, the amplifier stage in the charge amplifier is a single stage amplifier with a single sense transistor, the potential difference may be the gate-source voltage of the sense transistor.

Furthermore, the operation control circuitry may comprise finger detection evaluation circuitry; and image acquisition control circuitry, wherein the finger detection evaluation circuitry is connected to the finger detecting circuitry and to the image acquisition control circuitry for: receiving the finger detection signal; comparing the finger detection signal with the first threshold value indicating the first capacitive coupling and the second threshold value indicating the second capacitive coupling; providing, when the finger detection signal changes from a first value indicating a capacitive coupling weaker than the first capacitive coupling to a second value indicating a capacitive coupling stronger than the second capacitive coupling, a signal to the image acquisition control circuitry indicating that the finger has been detected; and wherein the image acquisition control circuitry is connected to the finger detection evaluation circuitry and to the sensing elements for: receiving, from the finger detection evaluation circuitry, the signal indicating that the finger has been detected; and controlling at least a subset of the sensing elements to acquire a representation of at least a part of the fingerprint pattern.

Further embodiments of, and effects obtained through this second aspect of the present invention are largely analogous to those described above for the first aspect of the invention.

In summary, the present invention relates to a method of sensing a fingerprint pattern of a finger using a fingerprint sensing device comprising an array of sensing elements; an electrically conductive finger detecting structure; and finger detecting circuitry connected to the finger detecting structure for providing a finger detection signal indicative of a capacitive coupling between the finger detecting structure and the finger. The method comprises the steps of: comparing the finger detection signal with a first threshold value indicating a first capacitive coupling, and a second threshold value indicating a second capacitive coupling stronger than the first capacitive coupling; and activating at least a subset of the sensing elements when the finger detection signal changes from a first value indicating a capacitive coupling weaker than the first capacitive coupling to a second value indicating a capacitive coupling stronger than the second capacitive coupling.

BRIEF DESCRIPTION OF THE DRAWINGS

These and other aspects of the present invention will now be described in more detail, with reference to the appended drawings showing an example embodiment of the invention, wherein:

FIG. 6 schematically shows an example of the finger detection signal.

DETAILED DESCRIPTION OF EXAMPLE EMBODIMENTS

Figure 1:
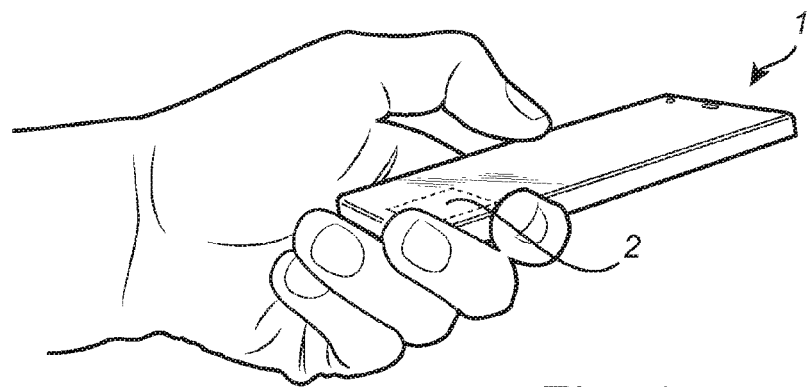
FIG. 1 schematically illustrates an application for a fingerprint sensing device according to an example embodiment of the present invention.

FIG. 1 schematically illustrates an application for a fingerprint sensing device according to an example embodiment of the present invention, in the form of a mobile phone 1 with an integrated fingerprint sensing device 2. The fingerprint sensing device 2 may, for example, be used for unlocking the mobile phone 1 and/or for authorizing transactions carried out using the mobile phone, etc.

Figure 2:
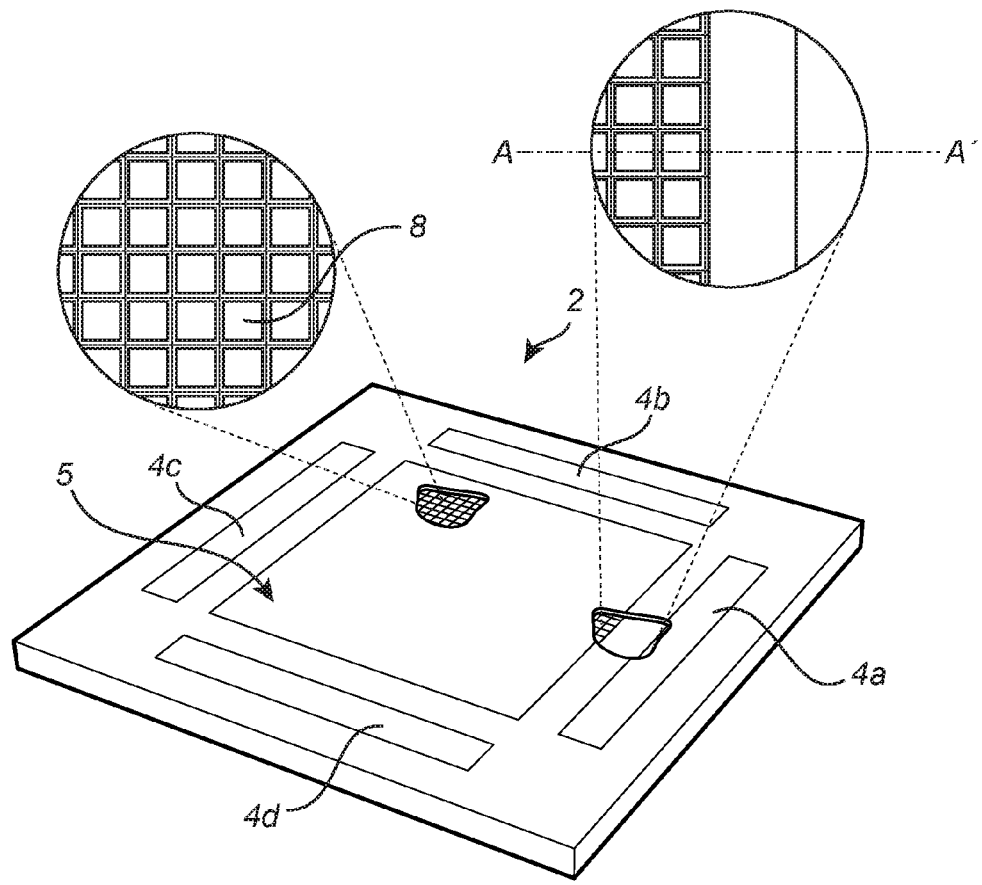
FIG. 2 schematically shows the fingerprint sensing device in FIG. 1.

FIG. 2 schematically shows the fingerprint sensing device 2 comprised in the mobile phone 1 in FIG. 1. As can be seen in FIG. 2, the fingerprint sensing device 2 comprises a sensor array 5, and finger detecting structures 4a-d. Although not shown in FIG. 2, the fingerprint sensing device 2 further comprises a power supply interface 6 and a communication interface 7. The sensor array 5 comprises a large number of sensing elements 8 (only one of the sensing elements has been indicated with a reference numeral to avoid cluttering the drawing), each being controllable to sense a distance between a sensing structure comprised in the sensing element 8 and the surface of a finger contacting the top surface of the sensor array 5.

In a battery powered electronic device, such as the mobile phone 1 in FIG. 1, keeping the energy consumption of various sub-systems, including the fingerprint sensing device 2, as low as possible is of utmost importance. In particular, the energy consumption of sub-systems that are not used during a given time period should be zero or close to zero during that time period.

Therefore, although not shown in FIG. 2, the fingerprint sensing device 2 in FIG. 2 is also provided with circuitry for determining if there is a finger present on the fingerprint sensing device and to activate the fingerprint sensing device when a finger is determined to be present so that the fingerprint sensing device can be in a very low power state between finger detection events.

Figure 3:
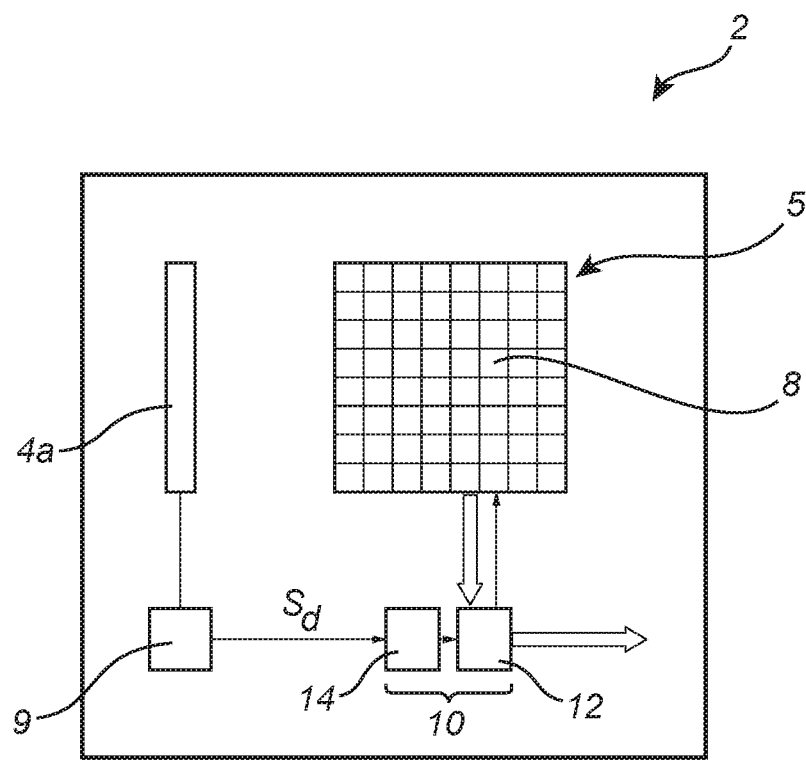
FIG. 3 is a block diagram of the fingerprint sensing device in FIG. 2.

Referring to the block diagram in FIG. 3, the fingerprint sensing device 2 comprises, in addition to the sensor array 5 and finger detecting structures 4a-d shown in FIG. 2, a finger detector circuit 9, and operation control circuitry 10 including a finger detection evaluation circuit 14 and an image acquisition control circuit 12. The finger detector circuit 9 is connected to the finger detecting structure 4a for providing a finger detection signal $S_d$ indicative of a capacitive coupling between the finger detecting structure 4a and an object (such as a finger) approaching the finger detecting structure 4a. In FIG. 3, only one of the finger detecting structures 4a is shown. The additional finger detecting structures 4b-d may all be connected to the same finger detector circuit 9, or each finger detecting structure may be connected to its own finger detector circuit.

As is schematically shown in FIG. 3, the finger detection evaluation circuit 14 is connected to the finger detector circuit 9 and to the image acquisition control circuit 12. The image acquisition control circuit 12 is connected to the sensor array 5.

Exemplary operation of the fingerprint sensing device 2 in FIG. 2 and FIG. 3 will be described further below with additional reference to the flow-chart in FIG. 5 and the diagram in FIG. 6. Before that, however, an example configuration of the finger detector circuit 9 and the sensing elements 8 and further measurement chain will be described with reference to FIG. 4.

Figure 4:
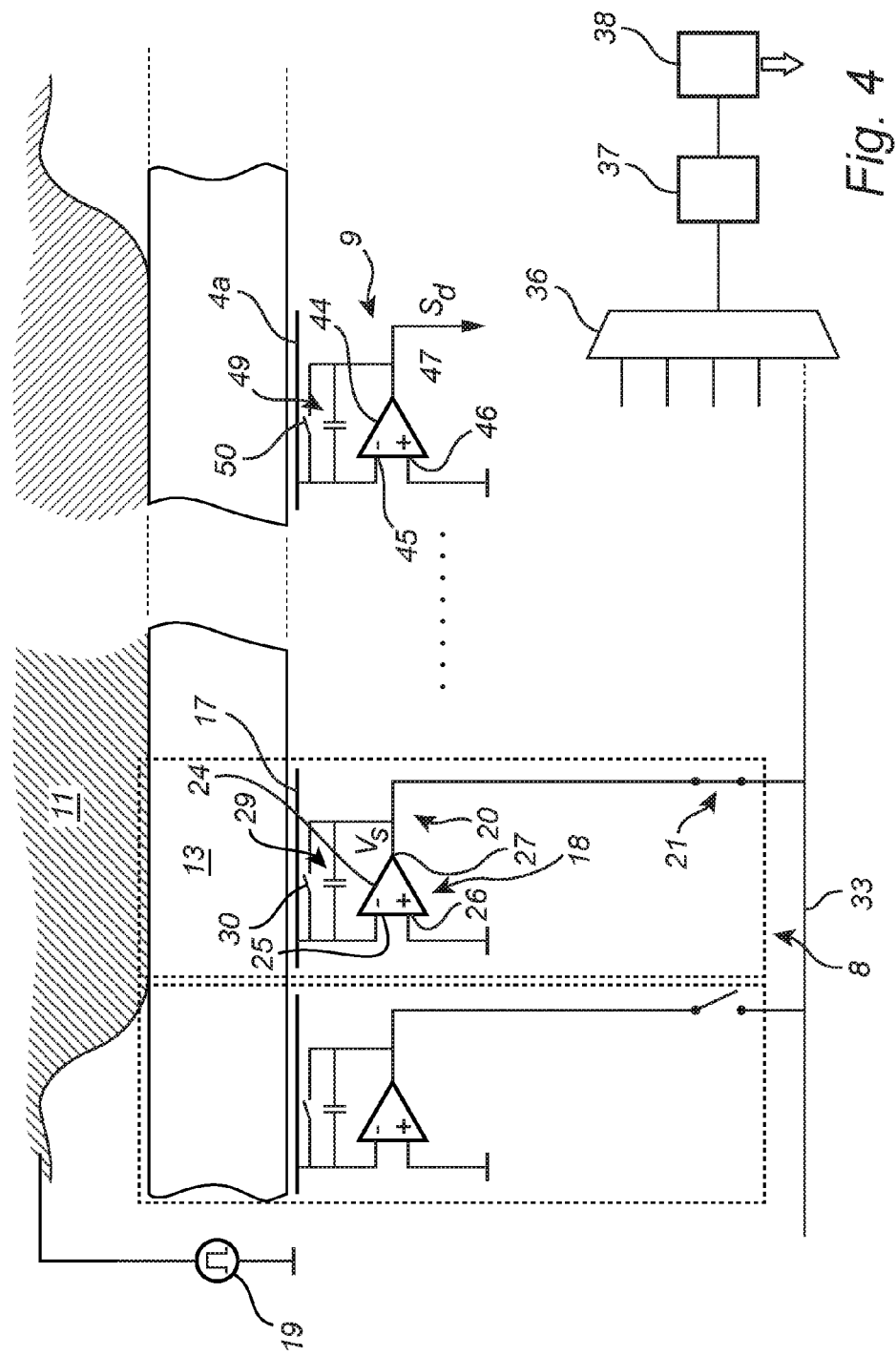
FIG. 4 is a schematic cross-section view of a portion of the fingerprint sensing device in FIG. 3.

FIG. 4 is a schematic cross section of a portion of the fingerprint sensing device 2 in FIG. 2 taken along the line A-A' as indicated in FIG. 2 with a finger 11 placed on top of a protective dielectric top layer 13 covering the sensor array 5 and the finger detecting structure 4a. Referring to FIG. 4, the fingerprint sensing device 2 comprises an excitation signal providing circuit 19 electrically connected to the finger via a conductive finger drive structure (not shown in FIG. 4), a plurality of sensing elements 8, and a finger detection arrangement comprising the finger detecting structure 4a and a finger detection circuit 9 connected to the finger detecting structure 4a.

As is schematically indicated in FIG. 4, each sensing element 8 comprises a conductive sensing structure, here in the form of a metal plate 17 underneath the protective dielectric top layer 13, a charge amplifier 18, and selection circuitry, here functionally illustrated as a simple selection switch 21 for allowing selection/activation of the sensing element 8.

The charge amplifier 18 comprises at least one amplifier stage, here schematically illustrated as an operational amplifier (op amp) 24 having a first input (negative input) 25 connected to the sensing structure 17, a second input (positive input) 26 connected to sensor ground or another reference potential, and an output 27. In addition, the charge amplifier 18 comprises a feedback capacitor 29 connected between the first input 25 and the output 27, and reset circuitry, here functionally illustrated as a switch 30, for allowing controllable discharge of the feedback capacitor 29. The charge amplifier 18 may be reset by operating the reset circuitry 30 to discharge the feedback capacitor 29.

As is often the case for an op amp 24 in a negative feedback configuration, the voltage at the first input 25 follows the voltage at the second input 26. Depending on the particular amplifier configuration, the potential at the first input 25 may be substantially the same as the potential at the second input 26, or there may be a substantially fixed offset between the potential at the first input 25 and the potential at the second input 26. In the configuration of FIG. 4, the first input 25 of the charge amplifier is virtually grounded.

When a time-varying potential is provided to the finger 11 by the excitation signal providing circuitry 19, a corresponding time-varying potential difference occurs between the sensing structure 17 and the finger 11.

The above-described change in potential difference between the finger 11 and the sensing structure 17 results in a sensing voltage signal $V_s$ on the output 27 of the charge amplifier 18.

When the indicated sensing element 8 is selected for sensing, the selection switch 21 is closed to provide the sensing signal to the readout line 33. The readout line 33, which may be a common readout line for a row or a column of the sensor array 5 in FIG. 2, is shown in FIG. 4 to be connected to a multiplexer 36. As is schematically indicated in FIG. 4, additional readout lines from other rows/columns of the sensor array 5 may also be connected to the multiplexer 36.

The output of the multiplexer 36 is connected to a sample-and-hold circuit 37 and an analog-to-digital converter 38 in series for sampling and converting the analog signals originating from the sensing elements 8 to a digital representation of the fingerprint pattern of the finger 11 on the sensor 2.

As is schematically indicated in FIG. 4, the finger detecting circuit 9 is here provided in the form of a charge amplifier similar in principle to the charge amplifier 18 comprised in the sensing element 8 described above. Accordingly, the finger detecting circuit 9 comprises at least one amplifier stage, here schematically illustrated as an operational amplifier (op amp) 44 having a first input (negative input) 45 connected to the finger detecting structure 4a, a second input (positive input) 46 connected to sensor ground or another reference potential, and an output 47. In addition, the charge amplifier comprises a feedback capacitor 49 connected between the first input 45 and the output 47, and reset circuitry, here functionally illustrated as a switch 50, for allowing controllable discharge of the feedback capacitor 49. The charge amplifier may be reset by operating the reset circuitry 50 to discharge the feedback capacitor 49. As is also indicated in FIG. 4, the output of the finger detecting circuitry is a finger detection signal $S_d$ (in the form of a voltage) indicative of the capacitive coupling between the finger 11 and the finger detecting structure 4a.

In FIG. 4, the finger 11 is shown as being connected to an excitation circuit 19 for providing the desired potential difference between the finger 11, and the sensing plates 17 of the sensor array 5 and the finger detecting structure 4a. It should be noted that this desired potential difference may alternatively be provided by changing the ground level of the fingerprint sensing device in relation to the ground level of the electronic device (such as mobile phone 1) in which the fingerprint sensing device 2 is included.

According to a further alternative embodiment, the finger detecting structure 4a may be locally controlled to alternate between a relatively low potential and a relatively high potential. In this alternative embodiment, the charge amplifier of the finger detecting circuit 9 may include a sense transistor having a gate constituting the first input 45. This sense transistor may be formed in a well in a semiconductor substrate and an interface between the well and the substrate may be configured in such a way that current can be prevented from flowing between the well and the substrate. To reduce the influence of a parasitic capacitance between the finger detecting structure and the well in the semiconductor substrate, the positive input 46 of the charge amplifier and the well may be controlled to together swing up and down in potential. This will result in the finger detecting plate 4a also swinging up and down in potential.

An exemplary embodiment of the method according to the present invention will now be described with reference to the flow-chart in FIG. 5 together with the illustrations in FIG. 3 and FIG. 6.

Before the method described below is started, the fingerprint sensing device is an a sleep mode with many parts, including the array of sensing elements 5, inactive to reduce the energy consumption of the fingerprint sensing device to a minimum.

In a first step 100, the finger detection signal $S_d$ provided by the finger detecting circuit 9 is received by the finger detection evaluation circuit 14 comprised in the operation control circuitry 10 of the fingerprint sensing device 2.

In the subsequent steps, the finger detection signal $S_d$ is evaluated with respect to different criteria, and the method either proceeds forward to the next step or returns to step 100 depending on the result of the different evaluations. This will be described with additional reference to FIG. 6, which is a diagram showing the finger detection signal as a function of time for an example situation.

Referring briefly to FIG. 6, the finger detection signal $S_d$ is shown to vary over time in relation to a first threshold value $TH_1$ indicating a first capacitive coupling between the finger detecting structure 4a and the finger 11 (or other object), and a second threshold value $TH_2$ indicating a second capacitive coupling between the finger detecting structure 4a and the finger 11 (or other object), stronger than the first capacitive coupling. In FIG. 6, a higher value of the finger detection signal $S_d$ thus indicates a stronger capacitive coupling. It should be noted that this is merely an illustrative example, and that there may be another relation between the finger detection signal and the above-mentioned capacitive coupling. For instance, a lower value of the finger detection signal $S_d$ may indicate a weaker capacitive coupling depending on the configuration of the finger detecting circuitry 9.

Figure 5:
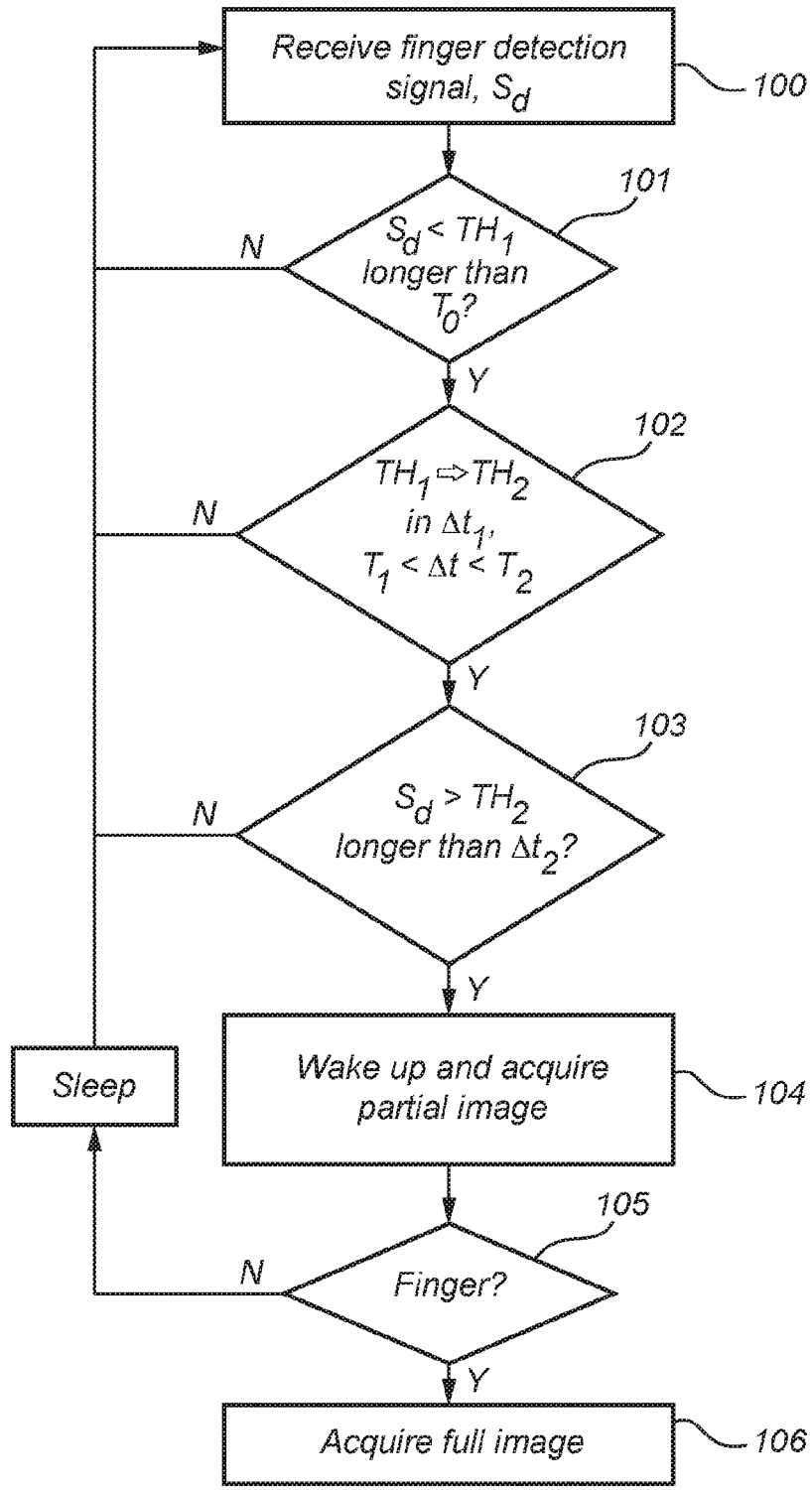
FIG. 5 is a flow-chart schematically illustrating a method according to an embodiment of the present invention.

Returning to the flow-chart in FIG. 5, the method proceeds to step 101, where it is determined if the finger detection signal indicates a capacitive coupling which is weaker than that corresponding to the first threshold value $TH_1$. In this example embodiment of the method according to the present invention, it is also checked in step 101 whether or not the finger detection signal indicates a weaker capacitive coupling than the first threshold $TH_1$ for a time duration longer than a predefined time duration $T_0$.

As can be seen in FIG. 6, the finger detection signal $S_d$ will go below the first threshold $TH_1$ at a first time $t_1$ and remain under the first threshold $TH_1$ until a second time $t_2$. In this case, the time duration from the first time $t_1$ to the second time $t_2$ is determined to be shorter than the predefined time duration $T_0$, which means that the condition in step 101 is not fulfilled and the method returns to step 100.

Again referring to FIG. 6, the finger detection signal $S_d$ will go below the first threshold $TH_1$ at a third time $t_3$. This time, as is schematically indicated in FIG. 6, the finger detection signal $S_d$ remains below the first threshold $TH_1$ longer than $T_0$, and the method therefore proceeds to the subsequent step 102.

In step 102, it is evaluated if the finger detection signal $S_d$ changes from below the first threshold $TH_1$ to above the second threshold $TH_2$ within a specified time duration. Referring to FIG. 6, the finger detection signal $S_d$ goes above the first threshold $TH_1$ at a fourth time $t_4$ and reaches the second threshold $TH_2$ at a fifth time $t_5$. The time duration $\Delta t_1$ of the increase in capacitive coupling corresponding to the change from the first threshold $TH_1$ to the second threshold $TH_2$ is compared to a lower limit $T_1$ that may be around 0.05 s and to an upper limit $T_2$ that may be around 0.5 s. As has been explained further above, a time duration $\Delta t_1$ shorter than the lower limit $T_1$ would be likely to result from noise, and a time duration $\Delta t_1$ longer than the upper limit $T_2$ would be unlikely to result from a deliberate placement of the finger on the fingerprint sensing device with the intention of acquiring a fingerprint pattern representation. In these cases, the method would return to step 100.

In the present example, referring to FIG. 6, the time duration $\Delta t_1$ is determined to be longer than the lower limit $T_1$ and shorter than the upper limit $T_2$, and is therefore determined to be likely to be consistent with a deliberate approach of a finger for touching the fingerprint sensing device.

The method therefore proceeds to step 103, for further qualification of the finger detection event before deciding to activate sensing elements. In step 103, the dwell time of the supposed finger on the fingerprint sensing device is evaluated to avoid activating sensing elements etc. in response to a noise signal or a very brief finger touch. If it is determined in step 103 that the finger detection signal $S_d$ is above the second threshold $TH_2$ for a time duration less than $\Delta t_2$, then it is determined that the supposed finger touch was either noise or too brief, the method returns to step 100. If it is instead determined that the finger detection signal $S_d$ is still above the second threshold at a sixth time $t_6$ (the time duration $\Delta t_2$ later than the fifth time $t_5$), the method instead proceeds to step 104, in which the image acquisition control circuitry 12 activates at least a part of the sensor array 5, as well as the sampling circuit 37 and the analog-to-digital converter 38 (referring to FIG. 3 and FIG. 4) to acquire a partial image. This partial image is evaluated in step 104 to determine if it the object touching the fingerprint sensing device is a finger. This may be determined in various ways known to one of ordinary skill in the art. For instance, a simple histogram can be formed or ridges can be identified.

If it is determined in step 105 that the object touching the fingerprint sensing device 2 is not a finger, the method returns to step 100. If, on the other hand, it is determined that there, which a very high likelihood, is a finger present on the fingerprint sensing device, the method proceeds to step 106 and acquires a full fingerprint image.

Subsequently, the fingerprint sensing device 2 may be put back to sleep, or additional fingerprint images may be acquired etc.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A method of sensing a fingerprint pattern of a finger using a fingerprint sensing device comprising:
   an array of sensing elements for sensing said fingerprint pattern;
   an electrically conductive finger detecting structure;
   finger detecting circuitry connected to said finger detecting structure for providing a finger detection signal indicative of a capacitive coupling between said finger detecting structure and said finger; and
   operation control circuitry connected to said sensing elements for activating said sensing elements to sense said fingerprint pattern, and connected to said finger detecting circuitry for evaluating said finger detection signal,
   wherein said method comprises the steps of:
   comparing said finger detection signal with a first threshold value indicating a first capacitive coupling between said finger detecting structure and said finger, and a second threshold value indicating a second capacitive coupling between said finger detecting structure and said finger, stronger than said first capacitive coupling; and
   activating, when said finger detection signal changes from a first value indicating a capacitive coupling weaker than said first capacitive coupling to a second value indicating a capacitive coupling stronger than said second capacitive coupling, at least a subset of said sensing elements to sense at least a portion of said fingerprint pattern.

2. The method according to claim 1, wherein said step of activating is only carried out when said finger detection signal changes from said first value to said second value within a time duration shorter than a first predefined time duration.

3. The method according to claim 2, wherein said first predefined time duration is shorter than 0.1 second.

4. The method according to claim 1, wherein said step of activating is only carried out when said finger detection signal indicates a capacitive coupling weaker than said first capacitive coupling for a time duration longer than a second predefined time duration before changing from said first value to said second value.

5. The method according to claim 4, wherein said second predefined time duration is longer than one second.

6. The method according to claim 1, wherein said step of activating is only carried out when said finger detection signal indicates a capacitive coupling stronger than said second capacitive coupling for a time duration longer than a third predefined time duration.

7. The method according to claim 6, wherein said third predefined time duration is longer than 10 milliseconds.

8. The method according to claim 1, wherein said fingerprint sensing device comprises at least a first and a second electrically conductive finger detecting structure, each being connected to said finger detecting circuitry, said method further comprising the steps of:
   evaluating a first finger detection signal indicative of a capacitive coupling between said first finger detecting structure and said finger; and
   evaluating a second finger detection signal indicative of a capacitive coupling between said second finger detecting structure and said finger,
   wherein said step of activating is only carried out when each of said first finger detection signal and said second finger detection signal changes from said first value to said second value.

9. The method according to claim 1, further comprising the steps of:
   evaluating said finger detection signal to determine a noise level of said finger detection signal; and
   determining said first threshold level based on said noise level.

10. The method according to claim 1, wherein said step of activating comprises the steps of:
    determining at least one sensing setting for at least one of said sensing elements based on a value of said finger detection signal indicating a capacitive coupling stronger than said second capacitive coupling; and
    sensing said portion of the fingerprint pattern using said at least one sensing setting.

11. The method according to claim 1, wherein said step of activating comprises the steps of:
    activating, when said finger detection signal changes from said first value to said second value, a subset of said sensing elements;
    evaluating a partial image resulting from said subset; and
    activating, when the evaluation of said partial image indicates that a finger can be sensed by said fingerprint sensing device, all sensing elements in said array of sensing elements to sense said fingerprint pattern.

12. A fingerprint sensing device for sensing a fingerprint pattern of a finger, said fingerprint sensing device comprising:
- an array of sensing elements for sensing said fingerprint pattern;
- an electrically conductive finger detecting structure;
- finger detecting circuitry connected to said finger detecting structure for providing a finger detection signal indicative of a capacitive coupling between said finger detecting structure and said finger; and
- operation control circuitry connected to said sensing elements and to said finger detecting circuitry for:
  - comparing said finger detection signal with a first threshold value indicating a first capacitive coupling between said finger detecting structure and said finger, and a second threshold value indicating a second capacitive coupling between said finger detecting structure and said finger, stronger than said first capacitive coupling; and
  - activating, when said finger detection signal changes from a first value indicating a capacitive coupling weaker than said first capacitive coupling to a second value indicating a capacitive coupling stronger than said second capacitive coupling, at least a subset of said sensing elements to sense said fingerprint pattern.

13. The fingerprint sensing device according to claim 12, comprising at least a first and a second electrically conductive finger detecting structure, each being connected to said finger detecting circuitry.

14. The fingerprint sensing device according to claim 13, wherein said array of sensing elements is arranged between said first and said second conductive finger detecting structure.

15. The fingerprint sensing device according to claim 12, wherein said operation control circuitry comprises:
- finger detection evaluation circuitry; and
- image acquisition control circuitry,
- wherein said finger detection evaluation circuitry is connected to said finger detecting circuitry and to said image acquisition control circuitry for:
  - receiving said finger detection signal;
  - comparing said finger detection signal with the first threshold value indicating said first capacitive coupling and the second threshold value indicating said second capacitive coupling;
  - providing, when said finger detection signal changes from a first value indicating a capacitive coupling weaker than said first capacitive coupling to a second value indicating a capacitive coupling stronger than said second capacitive coupling, a signal to said image acquisition control circuitry indicating that said finger has been detected; and
- wherein said image acquisition control circuitry is connected to said finger detection evaluation circuitry and to said sensing elements for:
  - receiving, from the finger detection evaluation circuitry, said signal indicating that said finger has been detected; and
  - controlling at least a subset of said sensing elements to acquire a representation of at least a part of said fingerprint pattern.

* * * * *